United States Patent
Shibata et al.

(10) Patent No.: US 10,943,339 B2
(45) Date of Patent: Mar. 9, 2021

(54) IMAGE COMPOSITING SYSTEM, IMAGE COMPOSITING METHOD, AND IMAGE COMPOSITING PROGRAM RECORDING MEDIUM

(71) Applicants: NEC Corporation, Tokyo (JP); TOKYO INSTITUTE OF TECHNOLOGY, Tokyo (JP)

(72) Inventors: Takashi Shibata, Tokyo (JP); Masatoshi Okutomi, Tokyo (JP); Masayuki Tanaka, Tokyo (JP)

(73) Assignees: NEC CORPORATION, Tokyo (JP); TOKYO INSTITUTE OF TECHNOLOGY, Tokyo (JP)

(*) Notice: Subject to any disclaimer, the term of this patent is extended or adjusted under 35 U.S.C. 154(b) by 34 days.

(21) Appl. No.: 16/344,214

(22) PCT Filed: Oct. 26, 2017

(86) PCT No.: PCT/JP2017/038721
§ 371 (c)(1),
(2) Date: Apr. 23, 2019

(87) PCT Pub. No.: WO2018/084069
PCT Pub. Date: May 11, 2018

(65) Prior Publication Data
US 2020/0074604 A1  Mar. 5, 2020

(30) Foreign Application Priority Data
Nov. 7, 2016  (JP) .............................. JP2016-217543

(51) Int. Cl.
*G06T 5/20* (2006.01)
*G06T 5/00* (2006.01)
*G06T 5/50* (2006.01)

(52) U.S. Cl.
CPC ................ *G06T 5/20* (2013.01); *G06T 5/003* (2013.01); *G06T 5/50* (2013.01)

(58) Field of Classification Search
CPC .. G06T 5/50; G06T 5/20; G06T 5/003; G06T 2207/20028
See application file for complete search history.

(56) References Cited

U.S. PATENT DOCUMENTS

2008/0267494 A1  10/2008  Cohen et al.
2015/0358542 A1  12/2015  Sato
(Continued)

FOREIGN PATENT DOCUMENTS

JP  2015-231220 A  12/2015
WO  2014/192487 A1  12/2014

OTHER PUBLICATIONS

C. Tomasi et al., "Bilateral Filtering for Gray and Color Images", Proceedings of the 1998 IEEE International Conference on Computer Vision, pp. 839-846, Bombay, India.
(Continued)

*Primary Examiner* — Brenda C Bernardi
(74) *Attorney, Agent, or Firm* — Sughrue Mion, PLLC

(57) ABSTRACT

The present invention enables a high-quality filtered image to be generated even from multimodal and multispectral images containing positional deviations. An image perturbation part generates a perturbed guide image group comprising first to K-th perturbed guide images obtained by deforming a guide image. A filtering part generates a filtered image group comprising first to K-th filtered images by applying first to K-th filtering processing to a target image by using the perturbed guide image group. A reliability calculation part calculates a reliability group comprising first to K-th reliabilities for the first to K-th filtered images of the filtered image group on the basis of first to K-th correlation values between the first to K-th perturbed guide images and
(Continued)

the target image. A weight optimization part generates, on the basis of the first to K-th reliabilities, a weight group comprising first to K-th weights to be respectively used when compositing the first to K-th filtered images. An output image compositing part composites an output image from the weight group and the filtered image group.

18 Claims, 4 Drawing Sheets

(56) References Cited

U.S. PATENT DOCUMENTS

2016/0098852 A1     4/2016   Senda et al.
2016/0309133 A1*   10/2016   Laroia ..................... G06T 5/20

OTHER PUBLICATIONS

Kaiming He et al., "Guided Image Filtering", IEEE Transactions on Pattern Analysis and Machine Intelligence, Jun. 2013, pp. 1397-1409, vol. 35, No. 6.
Xiaoyong Shen et al., "Mutual-Structure for Joint Filtering", 2015 IEEE International Conference on Computer Vision, pp. 3406-3414.
International Search Report of PCT/JP2017/038721 dated Jan. 23, 2018 [PCT/ISA/210].
Written Opinion of PCT/JP2017/038721 dated Jan. 23, 2018 [PCT/ISA/237].

* cited by examiner

IMAGE COMPOSITING SYSTEM, IMAGE COMPOSITING METHOD, AND IMAGE COMPOSITING PROGRAM RECORDING MEDIUM

CROSS REFERENCE TO RELATED APPLICATIONS

This application is a National Stage of International Application No. PCT/JP2017/038721, filed Oct. 26, 2017, claiming priority to Japanese Patent Application No. 2016-217543, filed Nov. 7, 2016, the contents of all of which are incorporated herein by reference in their entirety.

TECHNICAL FIELD

The present invention relates to an image compositing system, an image compositing method, and an image compositing program recording medium.

BACKGROUND ART

Recent development in device technology and software makes it possible to measure a measurement amount, such as temperature, a distance, and a moving vector, at high accuracy. Simultaneous use of images obtained by those devices is actively pursued. For instance, image processing for simultaneously using a visible image, a far-infrared image, a near-infrared image, a depth image, and so on is actively pursued.

By way of example, those techniques, such as techniques described in Non-Patent Literatures 1, 2 and 3, have been actively studied to use one of the visible image and a non-visible image as a guide (which will be called as "a guide image" hereinafter), to remove noises included in the other image (which will be called as "a target image" hereinafter), to up-sample the target image, to sharpen a fog region, or the like.

CITATION LIST

Non Patent Literature

NPL 1: Carlo Tomasi and Roberto Manduchi. "Bilateral Filtering for Gray and. Color Images", 1998 Sixth IEEE International Conference on Computer Vision, 1998

NPL 2: Kaiming He, Jinn. Sun, and. Xiaoou Tang. "Guided Image Filtering." European Conference on Computer Vision, Springer Berlin Heidelberg, 2010

NPL 3: Xiaoyong Shen, et al, "Mutual-Structure for Joint Filtering", Proceedings of the IEEE Internal Conference on Computer Vision, 2015

SUMMARY OF INVENTION

Technical Problem

However, between a visible camera and a non-visible camera, camera parameters such as an angle of view, an altitude, and so on are typically different. Therefore, positional deviation typically occurs.

In comparison with this, in a method of filtering processing using the guide image as described in Non-Patent Literatures 1, 2 and 3, it is premised that positioning is accurately carried out between the visible image and the non-visible image. When the method described in Non-Patent Literature 1, 2 or 3 is used for the visible image and the non-visible image between which the positional deviation exists, an artifact such as a halo effect, a ghost effect, or ringing occurs.

It is an object of the present invention to provide an image compositing system which is capable of resolving the above-mentioned problem.

Solution to Problem

An aspect of the present invention is an image compositing system comprising an image perturbation part configured to generate a perturbed guide image group comprising first to K-th perturbed guide images obtained by deforming a guide image, where K represents an integer which is not less than two: a filtering part configured to apply first to K-th filtering processing to a target image by using the perturbed image guide group to generate a filtered image group comprising first to K-th filtered images; a reliability calculation part configured to calculates a reliability group comprising first to K-th reliabilities for the first to K-th filtered images of the filtered image group on the basis of a correlation value group comprising first to K-th correlation values between the first to K-th perturbed guide images and the target image; a weight optimization part configured to calculate, on the basis of the first to K-th reliabilities, a weight group comprising first to K-th weights to be respectively used when compositing the first to K-th filtered images; and an output image compositing part configured to composite an output image from the weight group and the filtered image group.

Advantageous Effects of Invention

According to the present invention, it is possible to generate an image from which noises included in the image are removed, an up-sampled image, and an image in which a fog region is sharpened.

DESCRIPTION OF EMBODIMENT

Now, description will be made in detail about an example embodiment of the present invention with reference to the drawings.

[Description of Configuration]

Figure 1:
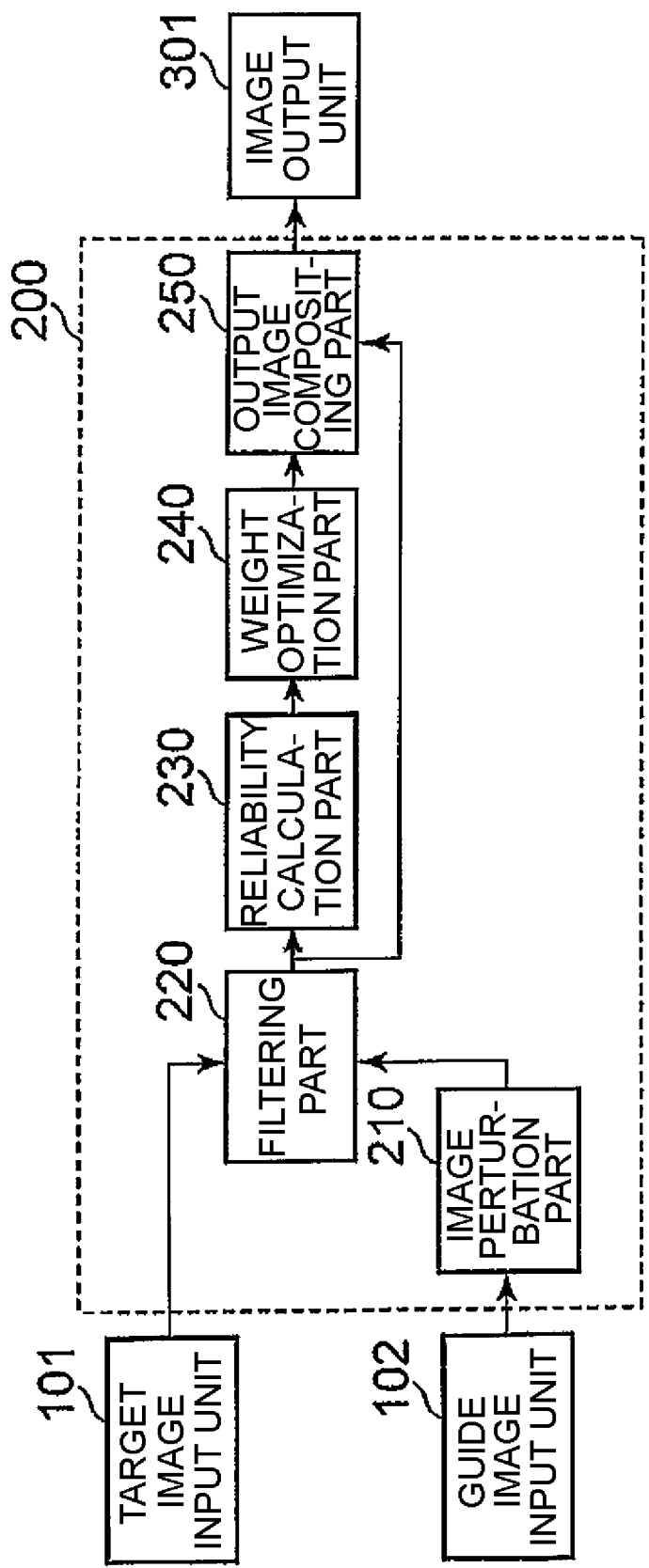
FIG. 1 is a block diagram for illustrating a schematic configuration of an image compositing system according to an example embodiment of the present invention.

FIG. 1 is a block diagram for illustrating a schematic configuration of an image compositing system according to an example embodiment of the present invention.

Referring to FIG. 1, the image compositing system according to the example embodiment of the present invention includes a target image input unit 101, a guide image input unit 102, a computer 200 which operates under program control, and an image output unit 301. The computer 200 may be configured, for example, as a central processing unit, a processor, or a data processing apparatus.

The computer 200 includes an image perturbation part 210, a filtering part 220, a reliability calculation part 230, a weight optimization part 240, and an output image compositing part 250.

Roughly, each of the above-mentioned means operates as follows.

The target image input unit 101 is supplied with, as a target image, an image or a measurement value which is obtained by a camera, a measurement sensor or the like. The image or the measurement value (the target image) to be supplied to the target image input unit 101 is not limited to a visible image and, for example, an image obtained by another sensor may be supplied. The target image input unit 101 records the image or the measurement value (the target image) supplied thereto in a memory (not shown) or the like.

The guide image input unit 102 is supplied with, as a guide image, an image or a measurement value which is obtained by a camera and a measurement sensor or the like. Like the target image input unit 101, the image or the measurement value (the guide image) to be supplied to the guide image input unit 102 is not limited to a visible image and, for example, an image obtained by another sensor may be supplied. For instance, the guide image input unit 102 may be supplied with, as the guide image, a depth image, a far-infrared image, a near-infrared image, and so on. The guide image input unit 102 records the image or the measurement value (the guide image) supplied thereto in a memory (not shown) or the like.

The image perturbation part 210 perturbs the guide image supplied through the guide image input unit 102 with respect to an amount of positional deviations to generate a perturbed guide image group. As a method of perturbing with respect to the amount of positional deviations, for example, an image may be translated in a longitudinal direction and a transversal direction of the image at a constant interval at every several pixels) to generate perturbed guide images. Alternatively, the image perturbation part 210 may generate the perturbed guide image group by image deformation such as rotational deformation, affine deformation, homography transformation as well as the translation. In the example embodiment of the present invention, a method of generating the perturbed guide image group is not limited to using the amount of positional deviations and the guide image may be transformed by giving, as perturbation, a part of more general image degradation process, for example, an amount of blur or magnification, to be used as the perturbed guide image group.

Hereinafter, for the purpose of explanation, it is assumed that the target image is represented by:

$$I(x), \quad \text{[Math. 1]}$$

a k-th perturbed guide image is represented by:

$$G(u_k, x) \quad \text{[Math. 2]}$$

and the perturbed guide image group is represented by $$\{G(u_k, x)\} \quad \text{[Math. 3]}$$

Accordingly, when the number of the perturbed guide images is represented by K(1≤k≤K), the perturbed guide image group includes first to K-th perturbed guide images.

The filtering part 220 generates a filtered image group including first to K-th filtered images by applying first to K-th filtering processing to the target image by using the perturbed guide image group. More specifically, the filtering part 220 uses the target image:

$$I(x) \quad \text{[Math. 4]}$$

and the above-mentioned perturbed guide image group:

$$\{G(u_k, x)\} \quad \text{[Math. 5]}$$

to generate the filtered image group. As a method of the respective filtering processing, a technique described in the above-mentioned. Patent Literature 1, 2, or 3 may be used. Hereinafter, the generated filtered image group is represented by:

$$\{I_k(x)\} \quad \text{[Math. 6]}$$

The reliability calculation part 230 calculates, on the basis of a correlation value group including first to K-th correlation values between the above-mentioned first to K-th perturbed guide images and the target image, a reliability group including first to K-th reliabilities for the first to K-th filtered images of the above-mentioned filtered image group. As the correlation value group between the perturbed guide image group and the target image, for instance, first to K-th objective functions used on the first to K-th filtering processing applied in the filtering part 220 may be used as the first to K-th correlation values.

Figure 2:
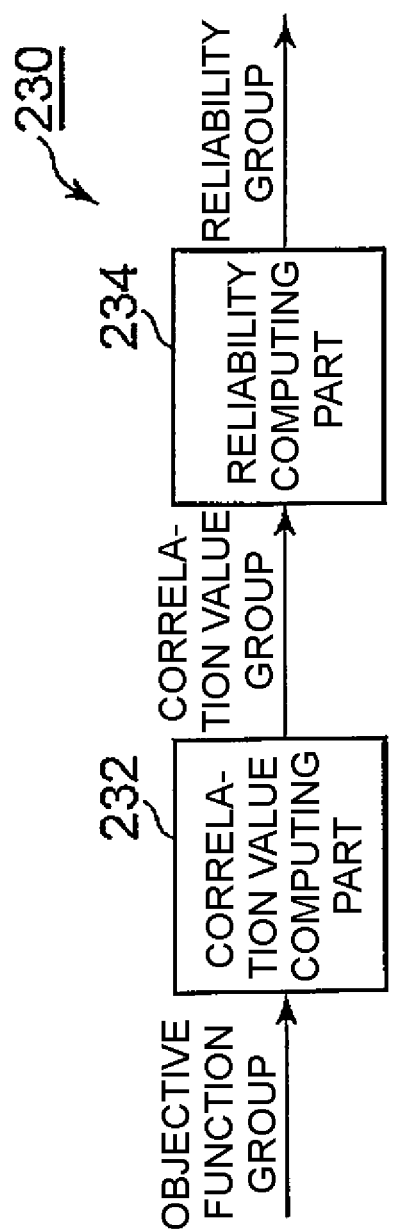
FIG. 2 is a block diagram for illustrating a configuration of a reliability calculation part for use in the image compositing system illustrated in FIG. 1.

Accordingly, the reliability calculation part 230 includes a correlation value computing part 232 and a reliability computing part 234, as shown in FIG. 2. The correlation value computing part 232 computes the correlation value group including the first to K-th correlation values on the basis of an objective function group including the first to K-th objective functions. The reliability computing part 234 computes the reliability group on the basis of the correlation value group.

For instance, in a case where an amount based on ridge regression is used as the objective function for filtering processing as shown in the following Math. 7, the correlation value computing part 232 may compute the correlation value by using that value.

$$C_{GF}(u_k, x) = (I(x) - a_{u_k, x} G(\tilde{x}_k) - b_{u_k, x})^2 \quad \text{[Math. 7]}$$

where $$a_{u_k, x}, b_{u_k, x} \quad \text{[Math. 8]}$$

are coefficients computed as a result of the ridge regression.

In addition, in a case where an amount based on two of error terms between the target image and the perturbed guide image group in addition to the correlation value based on the ridge repression are used as the objective function of the filtering processing as shown in the following Math. 9, the correlation computing part 232 may use that value as the correlation value.

$$C_{MSF}(u_k, x) = \lambda_I \|I(x) - I_0(x)\| + \lambda_G \|G(\tilde{x}_k) - G_0(\tilde{x}_k)\| + \\ (I(x) - a_{u_k, x}^I G(\tilde{x}_k) - b_{u_k, x}^I)^2 + (G(\tilde{x}_k) - a_{u_k, x}^G I(x) - b_{u_k, x}^G)^2 \quad \text{[Math. 9]}$$

where $$a_{u_k, x}^I, b_{u_k, x}^I, a_{u_k, x}^G, b_{u_k, x}^G \quad \text{[Math. 10]}$$

are coefficients computed as a result of the ridge regression. In addition, $\lambda_I$, $\lambda_G$ are parameters which are amounts determined by a user.

Alternatively, in a case where an amount based on a kernel function $K(\cdot)$ is used as the objective function of the filtering processing, the correlation computing part 232 may compute the correlation value by using that value as in the following Math. 11.

$$C_{JBF}(u_k, x) = (I(x) - I(x'))^2 K_{x,x',G(\tilde{x}),G(\tilde{x}')}, \quad \text{[Math. 11]}$$

$$K_{x,x',G(\tilde{x}),G(\tilde{x}')} = \exp\left[-\frac{(x-x')^2}{2\sigma_s^2} - \frac{(G(\tilde{x}) - G(\tilde{x}'))^2}{2\sigma_j^2}\right]$$

where $$K_{x,x',G(\tilde{x}),G(\tilde{x}')} \quad \text{[Math. 12]}$$

is the kernel function and $\sigma_s$, $\sigma_j$ are parameters determined by the user.

The correlation values used in the present invention are not limited to the above-mentioned values and may be, for example, any values representative of correlation between the target image and the perturbed guide image group. Such an amount representative of the correlation may be a normalized correlation, a square sum of differences, and a sum of absolute values of differences in a local area between the target image and the respective perturbed guide images. Alternatively, in the present invention, the correlation between the target image and the perturbed guide image group may be preliminarily learned by means of a method such as machine learning or the like and the correlation values may be computed by using this.

Subsequently, the reliability computing part 234 may use, for example, a softmax function such as the following Math. 14 to compute the k-th reliability:

$$\tilde{p}(u_k, x). \quad \text{[Math. 13]}$$

$$\tilde{p}(u_k, x, C(u, x)) = \frac{\exp[-\beta C(u_k, x)]}{\sum_k \exp[-\beta C(u_k, x)]} \quad \text{[Math. 14]}$$

where $\beta$ is a parameter which is an amount determined by the user.

In the above-mentioned example embodiment, description has been made as regards the method of calculating, in the reliability calculation part 230, the reliability group based on the correlation value group by using the softmax function. However, the present invention is not limited thereto. Generally, the reliability may be any monotone increasing function of the correlation value and, for example, a value of the correlation value may be used as it is. Alternatively, the reliability calculation part 230 may calculate the reliability by using a quadratic function, a polynomial function, a logarithmic function, or the like.

The weight optimization part 240 calculates, on the basis of the first to K-th reliabilities, a weight group including first to K-th weights to be respectively used when compositing the first to K-th filtered images. In this example, the weight optimization part 240 is based on the k-th reliability:

$$\tilde{p}(u_k, x) \quad \text{[Math. 15]}$$

and a spatial smoothness and a sparseness of the k-th reliability:

$$\tilde{p}(u_k, x) \quad \text{[Math. 16]}$$

and calculates the k-th weight:

$$p(u_k, x) \quad \text{[Math. 17]}$$

for compositing the k-th filtered image.

Figure 3:
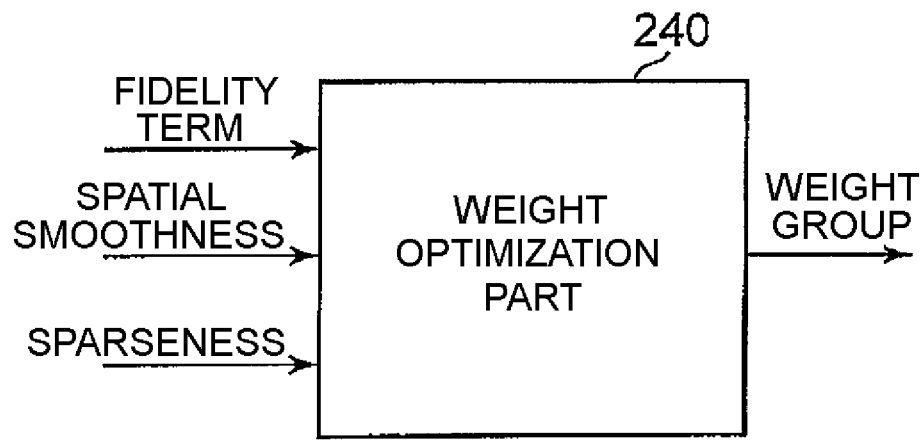
FIG. 3 is a block diagram for illustrating an example of an input/output relationship in a weight optimization part for use in the image compositing system illustrated in FIG. 1.

As illustrated in FIG. 3, a method of calculating the k-th weight:

$$p(u_k, x) \quad \text{[Math. 18]}$$

may be minimization of an energy function defined by, for example, the following Math. 20 based on a fidelity term related to the k-th reliability $$\tilde{p}(u_k, x), \quad \text{[Math. 19]}$$

the spatial smoothness, and the sparseness.

$$E[p(u_k, x)] = E_f[p(u_k, x)] + \eta E_s[p(u_k, x)] + \gamma E_{sp}[p(u_k, x)] \quad \text{[Math. 20]}$$

In the Math. 20, a first term of the right-hand side represents the fidelity term related to the k-th reliability:

$$\tilde{p}(u_k, x) \quad \text{[Math. 21]}$$

a second term of the right-hand side represents the spatial smoothness, and a third term of the right-hand side represents a term based on the sparseness. In addition, $\eta$ and $\gamma$ are parameters for adjusting magnitudes of the respective terms and are amounts determined by the user.

For example, the fidelity term related to the k-th reliability:

$$\tilde{p}(u_k, x) \quad \text{[Math. 22]}$$

may be, as defined in the following Math. 25, one which is defined as a square sum of differences between the k-th reliability:

$$\tilde{p}(u_k, x) \quad \text{[Math. 23]}$$

and the k-th weight:

$$p(u_k, x). \quad \text{[Math. 24]}$$

$$E[p(u_k, x)] = \sum_k \int dx |p(u_k, x) - \tilde{p}(u_k, x, C(u_k, x))|^2 \quad \text{[Math. 25]}$$

In the above-mentioned example embodiment, the fidelity term related to the k-th reliability:

$$\tilde{p}(u_k, x) \quad \text{[Math. 26]}$$

is the one which is defined as the square sum of the differences between the k-th reliability $$\tilde{p}(u_k, x) \quad \text{[Math. 27]}$$

and the *k*-th weight:

$$p(u_k, x) \quad \text{[Math. 28]}$$

However, the present invention is not limited thereto. The fidelity term may be any function related to the differences between the k-th reliability:

$$\tilde{p}(u_k, x) \quad \text{[Math. 29]}$$

and the *k*-th weight:

$$p(u_k, x) \quad \text{[Math. 30]}$$

For example, a sum of absolute values of the differences may be used as the fidelity term.

As the spatial smoothness, for example, a square sum of spatial derivatives of the k-th weight:

$$p(u_k, x) \quad \text{[Math. 31]}$$

may be used as represented by the following Math. 32.

$$E_s[p(u_k, x)] = \sum_k \int dx |\nabla_x p(u_k, x)|^2 \quad \text{[Math. 32]}$$

In the above-mentioned example embodiment, description has been made about a mode where the square sum of the spatial derivatives of the k-th weight:

$$p(u_k, x) \quad \text{[Math. 33]}$$

is used as an amount representative of the spatial smoothness. However, the present invention is not limited thereto. For instance, in lieu of the square sum of the spatial derivatives of the k-th weight:

$$p(u_k, x) \quad \text{[Math. 34]}$$

a sum of absolute values of the spatial derivatives may be used as the amount representative of the spatial smoothness. Alternatively, as a substitute for the spatial derivatives of the k-th weight:

$$p(u_k, x) \quad \text{[Math. 35]}$$

double derivatives may be used as the amount representative of the spatial smoothness. Thus, the amount representative of the spatial smoothness may be any amount which extracts a high-frequency component in any mode, without being limited to the above-mentioned methods.

As the term based on the sparseness, for example, as represented by the following Math. 37, a norm related to the k-th weight $$p(u_k, x) \quad \text{[Math. 36]}$$

may be used.

$$E_{sp}[p(u, x)] = \int dx \sum_k |p(u, x)|^\varepsilon \quad \text{[Math. 37]}$$

where ε is a parameter for adjusting the sparseness and is the parameter which is given by the user.

In the above-mentioned example embodiment, description has been made about the method of calculating a weight function by minimizing the energy function based on the fidelity term related to the reliability group, the spatial smoothness, and the sparseness. However, the present invention is not limited thereto. Typically, the weight optimization part 240 may use, as the weight function, values of the reliabilities as they are.

Figure 4:
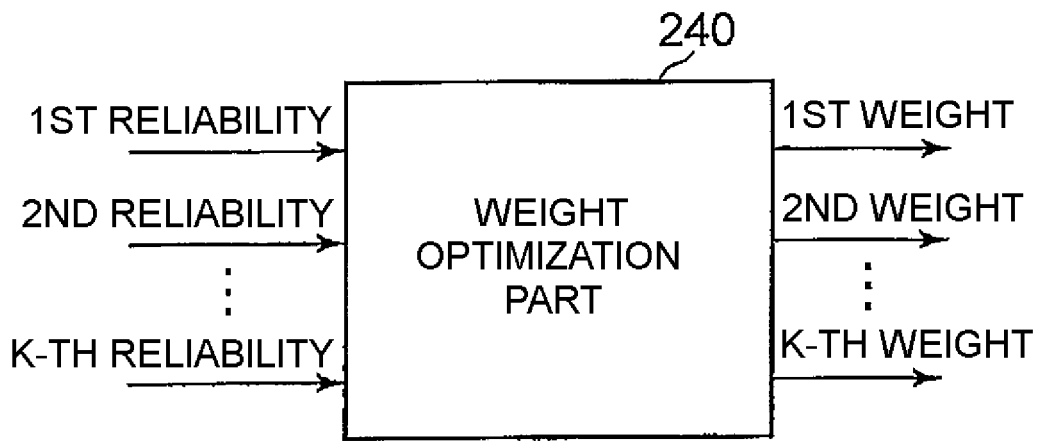
FIG. 4 is a block diagram for illustrating another example of an input/output relationship in the weight optimization part for use in the image compositing system illustrated in FIG. 1.

Alternatively, as illustrated in FIG. 4, the weight optimization part 240 may calculate the first to K-th weights in the manner such that, for each pixel, with respect to the first to K-th reliabilities, one in the filtered image group which corresponds to the maximum reliability is given a weight 1 and the others are given a weight 0.

Figure 5:
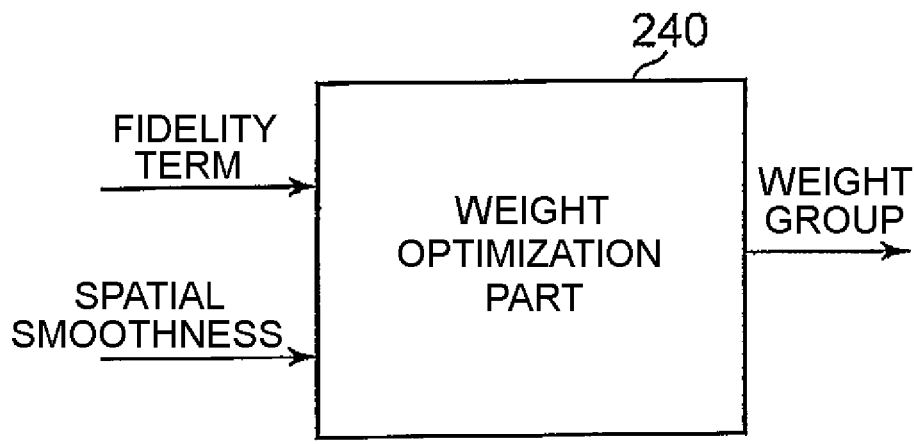
FIG. 5 is a block diagram for illustrating still another example of an input/output relationship in the weight optimization part for use in the image compositing system illustrated in FIG. 1.

Alternatively, as illustrated in FIG. 5, without using the above-mentioned energy function, the weight optimization part 240 may calculate the weight group by minimizing an energy function regarding only the fidelity term related to the reliability group and the spatial smoothness by using, for example, a technique of discrete optimization.

The output image compositing part 250 composites, from the above-mentioned k-th weight:

$$p(u_k, x) \quad \text{[Math. 38]}$$

and the above-mentioned filtered image group:

$$\{I_k(x)\} \quad \text{[Math. 39]}$$

an output image $$J(x) \quad \text{[Math. 40]}$$

as a linear combination thereof.

More specifically, the output image compositing part 250 may composite the output image, for example, as shown in the following Math. 41.

$$J(x) = \frac{\sum_k p(u_k, x) I_k(x)}{\sum_k p(u_k, x)} \quad \text{[Math. 41]}$$

In the above-mentioned example embodiment, description has been made about a case where the output image is represented as the linear combination of the k-th weight:

$$p(u_k, x) \quad \text{[Math. 42]}$$

and the filtered image group:

$$\{I_k(x)\} \quad \text{[Math. 43]}$$

However, the present invention is not limited thereto. For example, the output image compositing part 250 may composite the output image as a nonlinear combination of the k-th weight:

$$p(u_k, x) \quad \text{[Math. 44]}$$

and the filtered image group:

$$\{I_k(x)\} \quad \text{[Math. 45]}$$

Alternatively, the output image compositing part 250 may preliminarily learn a compositing rule for defining how to composite the output image in accordance with the k-th weight:

$$p(u_k, x), \quad \text{[Math. 46]}$$

and may composite, on the basis of the compositing rule, the output image from the filtered image group:

$$\{I_k(x)\} \quad \text{[Math. 47]}$$

The image output unit 301 outputs, using a monitor or the like, the output image:

$$J(x) \quad \text{[Math. 48]}$$

which is composited by the output image compositing part 250.

[Description of Operation]

Figure 6:
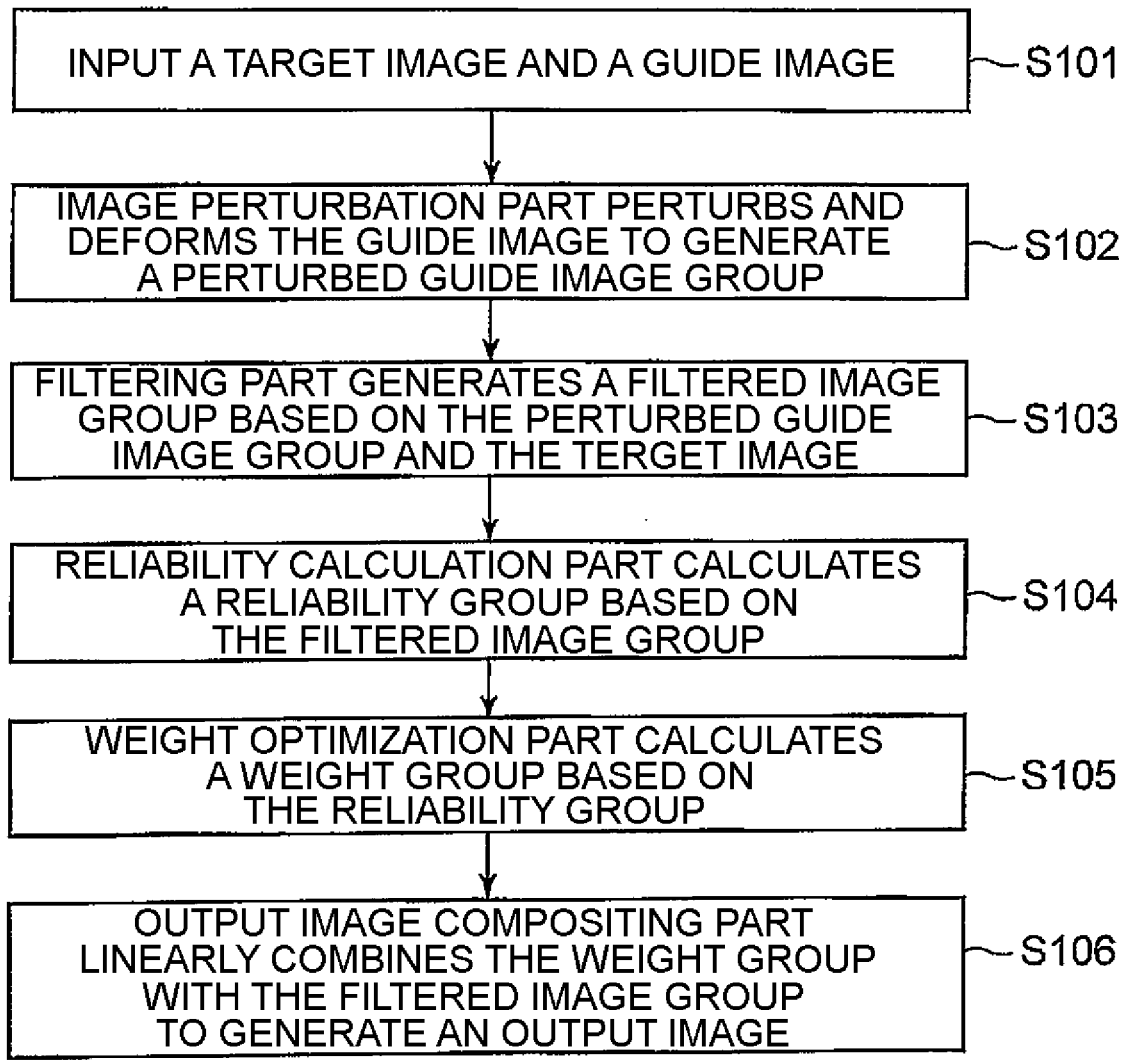
FIG. 6 is a flow chart for use in explaining an operation of the image compositing system illustrated in FIG. 1.

Next referring to a flow chart of FIG. 6, description will be made in detail about a whole operation of the image compositing system according to the example embodiment.

First of all, the target image input unit 101 and the guide image input unit 102 input a target image as an object to be processed and a guide image (step S101).

Subsequently, the image perturbation part 210 perturbs and deforms the guide image to generate a perturbed guide image group including first to K-th perturbed guide images (step S102).

Next, the filtering part 220 generates, based on the perturbed guide image group and the target image, a filtered image group including first to K-th filtered images (step S103).

Next, the reliability calculation part 230 calculates a reliability group including first to K-th reliabilities for the first to K-th filtered images of the filtered image group (step S104).

Next, the weight optimization part 240 calculates a weight group on the basis of the reliability group calculated by the reliability calculation part 230 (step S105).

Next, the output image compositing part 250 composites an output image from the weight group calculated by the weight optimization part 240 and the filtered image group, and the image output unit 301 outputs the output image (step S106).

[Description of Effect]

Next, an effect of the example embodiment will be described.

According to the example embodiment, by applying filtering using a guide to a visible image and a non-visible image which contain positional deviation, it is possible to generate an image from which noises included in the image are removed, an up-sampled image, and an image in which a fog region is sharpened while suppressing an artifact such as a ghost effect and a halo effect. This is because a filtered image is generated using a guide image which is perturbed with respect to the positional deviations and a weight for a linear combination thereof is adaptively calculated on the basis of a reliability of filtering processing for each pixel.

Respective parts of the image compositing system may be implemented by using a combination of hardware and software. In a form in which the hardware and the software are combined, the respective parts are implemented as various kinds of means by deploying an image compositing program in a RAM (random access memory) and making the hardware, such as a control unit (CPU (central processing unit)) or the like, operate based on the image compositing program. The image compositing program may be recorded in a recording medium to be distributed. The image compositing program recorded in the recording medium is read into a memory via a wire, wirelessly, or via the recording medium itself to operate the control unit and so on. By way of example, the recording medium may be an optical disc, a magnetic disk, a semiconductor memory device, a hard disk, or the like.

Explaining the above-mentioned example embodiment with different expression, it is possible to implement the embodiment by making a computer to be operated as the image compositing system act as the image perturbation part 210, the filtering part 220, the reliability calculation part 230, the weight optimization part 240, and the output image compositing part 250 according to the image compositing program deployed on the RAM.

The present invention is not limited to the specific configurations of the above-mentioned example embodiment, and the present invention involves any changes in a range not departing from the gist of the present invention.

While the present invention has been described with reference to the example embodiment thereof, the present invention is not limited to the foregoing example embodiment. The configuration and the details of the present invention may be modified within the scope of the present invention in various manners which could be understood by those of ordinary skill.

A part or a whole of the example embodiment disclosed above may also be described by, but are not limited to, the following supplementary notes.

(Supplementary Note 1)

An image compositing system comprising an image perturbation part configured to generate a perturbed guide image group comprising first to K-th perturbed guide images obtained by deforming a guide image, where K represents an integer which is not less than two; a filtering part configured to apply first to K-th filtering processing to a target image by using the perturbed image guide group to generate a filtered image group comprising first to K-th filtered images; a reliability calculation part configured to calculates a reliability group comprising first to K-th reliabilities for the first to K-th filtered images of the filtered image group on the basis of a correlation value group comprising first to K-th correlation values between the first to K-th perturbed guide images and the target image; a weight optimization part configured to calculate, on the basis of the first to K-th reliabilities, a weight group comprising first to K-th weights to be respectively used when compositing the first to K-th filtered images; and an output image compositing part configured to composite an output image from the weight group and the filtered image group.

(Supplementary Note 2)

The image compositing system according to Supplementary Note 1, wherein the image perturbation part is configured to generate the perturbed guide image group by deforming the guide image with respect to an amount of positional deviations.

(Supplementary Note 3)

The image compositing system according to Supplementary Note 1 or 2, wherein the reliability calculation part is configured to calculate the first to K-th correlation values between the first to K-th perturbed guide images and the target image on the basis of an objective function group comprising first to K-th objective functions which are used on the first to K-th filtering processing of the corresponding filtering part.

(Supplementary Note 4)

The image compositing system according to any one of Supplementary Notes 1 to 3, wherein the weight Optimization part is configured to calculate the weight group by minimizing an energy function based on a fidelity term related to the reliability group calculated by the reliability calculation part and on a spatial smoothness of the reliability group.

(Supplementary Note 5)

The image compositing system according to any one of Supplementary Notes 1 to 3, wherein the weight optimization part is configured to calculate the weight group by minimizing an energy function based on a fidelity term related to the reliability group calculated by the reliability calculation part, on a spatial smoothness of the reliability group, and on a sparseness of the reliability group.

(Supplementary Note 6)

The image compositing system according to any one of Supplementary Notes 1 to 3, wherein the weight optimization part is configured to use, as the first to K-th weights, 1 for one among the first to K-th reliabilities calculated by the reliability calculation part that has a maximum value per each pixel and 0 for the other reliabilities.

(Supplementary Note 7)

An image compositing method comprising an image perturbation step of generating, by an image perturbation part, a perturbed guide image group comprising first to K-th perturbed guide images obtained by deforming a guide image, where K represents an integer not less than two; a filtering step of applying, in a filtering part, first to K-th filtering processing to a target image by using the perturbed guide image group to generate a filtered image group comprising first to K-th filtered images; a reliability calculation step of calculating, by a reliability calculation part, a reliability group comprising first to K-th reliabilities for the first to K-th filtered images of the filtered image group on the basis of a correlation value group comprising first to K-th correlation values between the first to K-th perturbed images and the target image; a weight optimization step of calculating, by a weight optimization part, on the basis of the first to K-th reliabilities, a weight group comprising first to K-th weights to be respectively used when compositing the first to K-th filtered images; and an output image compositing step of compositing, in an output image compositing part, an output image from the weight group and the filtered image group.

(Supplementary Note 8)

The image compositing method according to Supplementary Note 7, wherein, in the image perturbation step, the image perturbation part generates the perturbed guide image group by deforming the guide image with respect to an amount of positional deviations.

(Supplementary Note 9)

The image compositing method according to Supplementary Note 7 or 8, wherein, in the reliability calculation step, the reliability calculation part calculates the first to K-th correlation values between the first to K-th perturbed guide images and the target image on the basis of an objective function group comprising first to K-th objective functions which are used on the first to K-th filtering processing of the corresponding filtering part.

(Supplementary Note 10)

The image compositing method according to any one of Supplementary Notes 7 to 9, wherein, in the weight optimization step, the weight optimization part calculates the weight group by minimizing an energy function based on a fidelity term related to the reliability group calculated in the reliability calculation step and on a spatial smoothness of the reliability group.

(Supplementary Note 11)

The image compositing method according to any one of Supplementary Notes 7 to 9, wherein, in the weight optimization step, the weight optimization part calculates the weight group by minimizing an energy function based on a fidelity term related to the reliability group calculated in the reliability calculation step, on a spatial smoothness of the reliability group, and on a sparseness of the reliability group.

(Supplementary Note 12)

The image compositing method according to any one of Supplementary Notes 7 or 9, wherein, in the weight optimization step, the weight optimization part uses, as the first to K-th weights, 1 for one among the first to K-th reliabilities calculated in the reliability calculation step that has a maximum value per each pixel and 0 for the other reliabilities.

(Supplementary Note 13)

An image compositing program recording medium recording an image compositing program for causing a computer to execute an image perturbation procedure for generating a perturbed guide image group comprising first to K-th perturbed guide images obtained by deforming a guide image, where K represents an integer which is not less than two; a filtering procedure for applying first to K-th filtering processing to a target image by using the perturbed image guide group to generate a filtered image group comprising first to K-th filtered images; a reliability calculation procedure for calculating a reliability group comprising first to K-th reliabilities for the first to K-th filtered images of the filtered image group on the basis of a correlation value group comprising first to K-th correlation values between the first to K-th perturbed guide images and the target image; a weight optimization procedure for calculating, on the basis of the first to K-th reliabilities, a weight group comprising first to K-th weights to be respectively used when compositing the first to K-th filtered images; and an output image compositing procedure for compositing an output image from the weight group and the filtered image group.

(Supplementary Note 14)

The image compositing program recording medium according to Supplementary Note 13, wherein the image perturbation procedure causes the computer to generate the perturbed guide image group by deforming the guide image with respect to an amount of positional deviations.

(Supplementary Note 15)

The image compositing program recording medium according to Supplementary Note 13 or 14, wherein the reliability calculation procedure causes the computer to calculate the first to K-th correlation values between the first to K-th perturbed guide images and the target image on the basis of an objective function group comprising first to K-th objective functions which are used on the first to K-th filtering processing of the corresponding filtering part.

(Supplementary Note 16)

The image compositing program recording medium according to any one of Supplementary Notes 13 to 15, wherein the weight optimization procedure causes the computer to calculate the weight group by minimizing an energy function based on a fidelity term related to the reliability group calculated by the reliability calculation procedure and on a spatial smoothness of the reliability group.

(Supplementary Note 17)

The image compositing program recording medium according to any one of Supplementary Notes 13 to 15, wherein the weight optimization procedure causes the computer to calculate the weight group by minimizing an energy function based on a fidelity term related to the reliability group calculated by the reliability calculation procedure, on a spatial smoothness of the reliability group, and on a sparseness of the reliability group.

(Supplementary Note 18)

The image compositing program recording medium according to any one of Supplementary Notes 13 to 15, wherein the weight optimization procedure causes the computer to use, as the first to K-th weights, 1 for one among the first to K-th reliabilities calculated in the reliability calculation step that has a maximum value per each pixel and 0 for the other reliabilities.

REFERENCE SIGNS LIST 101 target image input unit
102 guide image input unit
200 computer (central processing unit, processor, data processing apparatus)
210 image perturbation part
220 filtering part
230 reliability calculation part
232 correlation value computing part
234 reliability computing part
240 weight optimization part
250 output image compositing part
301 image output unit

The invention claimed is:

1. An image compositing system comprising:
an image perturbation part configured to generate a perturbed guide image group comprising first to K-th perturbed guide images obtained by deforming a guide image, where K represents an integer which is not less than two;
a filtering part configured to apply first to K-th filtering processing to a target image by using the perturbed image guide group to generate a filtered image group comprising first to K-th filtered images;
a reliability calculation part configured to calculate a reliability group comprising first to K-th reliabilities for the first to K-th filtered images of the filtered image group on the basis of a correlation value group comprising first to K-th correlation values between the first to K-th perturbed guide images and the target image;
a weight optimization part configured to calculate, on the basis of the first to K-th reliabilities, a weight group comprising first to K-th weights to be respectively used when compositing the first to K-th filtered images; and
an output image compositing part configured to composite an output image from the weight group and the filtered image group.

2. The image compositing system as claimed in claim 1, wherein the image perturbation part is configured to generate the perturbed guide image group by deforming the guide image with respect to an amount of positional deviations.

3. The image compositing system as claimed in claim 1, wherein the reliability calculation part is configured to calculate the first to K-th correlation values between the first to K-th perturbed guide images and the target image on the basis of an objective function group comprising first to K-th objective functions which are used on the first to K-th filtering processing of the corresponding filtering part.

4. The image compositing system as claimed in claim 1, wherein the weight optimization part is configured to calculate the weight group by minimizing an energy function based on a fidelity term related to the reliability group calculated by the reliability calculation part and on a spatial smoothness of the reliability group.

5. The image compositing system as claimed in claim 1, wherein the weight optimization part is configured to calculate the weight group by minimizing an energy function based on a fidelity term related to the reliability group calculated by the reliability calculation part, on a spatial smoothness of the reliability group, and on a sparseness of the reliability group.

6. The image compositing system as claimed in claim 1, wherein the weight optimization part is configured to use, as the first to K-th weights, 1 for one among the first to K-th reliabilities calculated by the reliability calculation part that has a maximum value per each pixel and 0 for the other reliabilities.

7. An image compositing method comprising:
generating a perturbed guide image group comprising first to K-th perturbed guide images obtained by deforming a guide image, where K represents an integer not less than two;
applying, first to K-th filtering processing to a target image by using the perturbed guide image group to generate a filtered image group comprising first to K-th filtered images;
calculating a reliability group comprising first to K-th reliabilities for the first to K-th filtered images of the filtered image group on the basis of a correlation value group comprising first to K-th correlation values between the first to K-th perturbed images and the target image;
calculating on the basis of the first to K-th reliabilities, a weight group comprising first to K-th weights to be respectively used when compositing the first to K-th filtered images; and
compositing an output image from the weight group and the filtered image group.

8. The image compositing method as claimed in claim 7, wherein the generating the perturbed guide image group generates the perturbed guide image group by deforming the guide image with respect to an amount of positional deviations.

9. The image compositing method as claimed in claim 7, wherein the calculating the reliability group calculates the first to K-th correlation values between the first to K-th perturbed guide images and the target image on the basis of an objective function group comprising first to K-th objective functions which are used on the first to K-th filtering processing.

10. The image compositing method as claimed in claim 7, wherein the calculating the weight group calculates the weight group by minimizing an energy function based on a fidelity term related to the reliability group calculated in the reliability calculation step and on a spatial smoothness of the reliability group.

11. The image compositing method as claimed in claim 7, wherein the calculating the weight group calculates the weight group by minimizing an energy function based on a fidelity term related to the reliability group calculated in the reliability calculation step, on a spatial smoothness of the reliability group, and on a sparseness of the reliability group.

12. The image compositing method as claimed in claim 7, wherein the calculating the weight group uses, as the first to K-th weights, 1 for one among the first to K-th reliabilities calculated in the reliability calculation step that has a maximum value per each pixel and 0 for the other reliabilities.

13. A non-transitory computer readable image compositing program recording medium recording an image compositing program for causing a computer to execute:
an image perturbation procedure for generating a perturbed guide image group comprising first to K-th perturbed guide images obtained by deforming a guide image, where K represents an integer which is not less than two;
a filtering procedure for applying first to K-th filtering processing to a target image by using the perturbed image guide group to generate a filtered image group comprising first to K-th filtered images;
a reliability calculation procedure for calculating a reliability group comprising first to K-th reliabilities for the first to K-th filtered images of the filtered image group on the basis of a correlation value group comprising first to K-th correlation values between the first to K-th perturbed guide images and the target image;
a weight optimization procedure for calculating, on the basis of the first to K-th reliabilities, a weight group comprising first to K-th weights to be respectively used when compositing the first to K-th filtered images; and
an output image compositing procedure for compositing an output image from the weight group and the filtered image group.

14. The non-transitory computer readable image compositing program recording medium as claimed in claim 13, wherein the image perturbation procedure causes the computer to generate the perturbed guide image group by deforming the guide image with respect to an amount of positional deviations.

15. The non-transitory computer readable image compositing program recording medium as claimed in claim 13, wherein the reliability calculation procedure causes the computer to calculate the first to K-th correlation values between the first to K-th perturbed guide images and the target image on the basis of an objective function group comprising first to K-th objective functions which are used on the first to K-th filtering processing of the filtering procedure.

16. The non-transitory computer readable image compositing program recording medium as claimed in claim 13, wherein the weight optimization procedure causes the computer to calculate the weight group by minimizing an energy function based on a fidelity term related to the reliability group calculated by the reliability calculation procedure and on a spatial smoothness of the reliability group.

17. The non-transitory computer readable image compositing program recording medium as claimed in claim 13, wherein the weight optimization procedure causes the computer to calculate the weight group by minimizing an energy function based on a fidelity term related to the reliability group calculated by the reliability calculation procedure, on a spatial smoothness of the reliability group, and on a sparseness of the reliability group.

18. The non-transitory computer readable image compositing program recording medium as claimed in claim 13, wherein the weight optimization procedure causes the computer to use, as the first to K-th weights, 1 for one among the first to K-th reliabilities calculated in the reliability calculation step that has a maximum value per each pixel and 0 for the other reliabilities.

* * * * *